(12) United States Patent
Poon et al.

(10) Patent No.: US 6,490,630 B1
(45) Date of Patent: Dec. 3, 2002

(54) SYSTEM AND METHOD FOR AVOIDING DEADLOCK IN MULTI-NODE NETWORK

(75) Inventors: Wing Leong Poon, Santa Clara, CA (US); Patrick J. Helland, Bellevue, WA (US); Takeshi Shimizu, San Jose, CA (US); Yasushi Umezawa, Cupertino, CA (US); Wolf-Dietrich Weber, San Jose, CA (US)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 09/285,316

(22) Filed: Apr. 2, 1999

Related U.S. Application Data (60) Provisional application No. 60/084,795, filed on May 8, 1998.

(51) Int. Cl.[7] ............................................. G06F 15/16

(52) U.S. Cl. ..................... 709/235; 709/232; 709/234; 370/229; 370/231; 370/232

(58) Field of Search ................................ 709/200, 201, 709/206, 207, 235, 234, 232; 370/229, 231, 232

(56) References Cited

U.S. PATENT DOCUMENTS

| | | | | |
|---|---|---|---|---|
| 5,381,413 A | * | 1/1995 | Tobagi et al. | 370/448 |
| 5,490,007 A | * | 2/1996 | Bennet et al. | 359/139 |
| 5,859,850 A | * | 1/1999 | Lien | 370/396 |
| 5,999,964 A | * | 12/1999 | Murakata et al. | 709/201 |
| 6,055,564 A | * | 4/2000 | Phaal | 709/207 |
| 6,076,112 A | * | 6/2000 | Hauser et al. | 709/234 |
| 6,092,108 A | * | 7/2000 | DiPlacido et al. | 709/224 |
| 6,175,554 B1 | * | 1/2001 | Jang et al. | 370/229 |
| 6,188,698 B1 | * | 2/2001 | Galand et al. | 370/412 |
| 6,212,582 B1 | * | 4/2001 | Chong et al. | 710/57 |

OTHER PUBLICATIONS

U.S. patent application Ser. No. 09/287,650, Shimizu, filed Apr. 7, 1999.
U.S. patent application Ser. No. 09/041,568, Weber, filed Mar. 12, 1998.
U.S. patent application Ser. No. 09/304,432, Masri, filed May 3, 1999.
U.S. patent application Ser. No. 09/281,714, Wilson, filed Mar. 30, 1999.
"IEEE Standard for Scalable Coherent Interface (SCI)," ANSI/IEEE Std. 1596–1992, Chapter 1 (1992), pp. 1–38.
Kubiatowcz & Agarwal, "Anatomy of a Message in the Alewife Multiprocessor," Proceedings of the 7th ACM International Conference on Supercomputing, Jul. 1993.
Lenoski & Weber, "Scalable Shared–Memory Multiprocessing," 1995, sections 4.2 & 6.1, pp. 134–136 and 173–181.

* cited by examiner

*Primary Examiner*—Saleh Najjar
(74) *Attorney, Agent, or Firm*—Carr & Ferrell, LLP (57) ABSTRACT

A computer architecture for avoiding a deadlock condition in an interconnection network comprises a messaging buffer having a size pre-calculated to temporarily store outgoing messages from a node. Messages are classified according to their service requirements and messaging protocols, and reserved quotas in the messaging buffer are allocated for different types of messages. The allocations of the reserved quotas are controlled by a mechanism that, to prevent overflow, limits the maximum number of messages that can be outstanding at any time. The messaging buffer is sized large enough to guarantee that a node is always able to service incoming messages, thereby avoiding deadlock and facilitating forward progress in communications. The buffer may be bypassed to improve system performance when the buffer is empty or when data in the buffer is corrupted. In addition, a multicast engine facilitates dense packing of the buffer and derives information from a message header to determine whether there is a multicast to perform and to permit passage of messages. Other considerations to reduce the buffer size are incorporated.

21 Claims, 6 Drawing Sheets

SYSTEM AND METHOD FOR AVOIDING DEADLOCK IN MULTI-NODE NETWORK

This application claims the benefit of U.S. Provisional Application No. 60/084,795, filed on May 8, 1998.

CROSS-REFERENCE TO CO-PENDING APPLICATIONS

This application is related to co-pending U.S. patent application Ser. No. 09/041,568, entitled "Cache Coherence Unit for Interconnecting Multiprocessor Nodes Having Pipelined Snoopy Protocol," filed on Mar. 12, 1998 now pending; co-pending U.S. patent application Ser. No. 09/003,771, entitled "Memory Protection Mechanism for a Distributed Shared Memory Multiprocessor with Integrated Message Passing Support," filed on Jan. 7, 1998 now pending; co-pending U.S. patent application Ser. No. 09/003,721, entitled "Cache Coherence Unit with Integrated Message Passing and Memory Protection for a Distributed, Shared Memory Multiprocessor System," filed on Jan. 7, 1998 now pending; and co-pending U.S. patent application Ser. No. 09/281,714 "Split Sparse Directory for a Distributed Shared Memory Multiprocessor System," filed on Mar. 30, 1999, which are hereby incorporated by reference now pending.

BACKGROUND OF THE INVENTION

1. Technical Field

This invention relates generally to computer network messaging and more particular to avoiding deadlock while controlling messages in a multi-node computer network.

2. Discussion of Background Art

In multi-node computer networks, nodes communicate with each other by passing network messages through an interconnect. These network messages support different forms of communication between nodes, depending on the nature and requirements of the network. In parallel processing systems, for example, the network messages specifically support cache-coherence communication in shared-memory multiprocessor systems, and support message-passing communication in distributed-memory multi-computer systems. Frequently, a single computer system supports more than one form of message communication.

For a network to operate correctly, it is important to prevent deadlock while controlling network messages. In general, deadlock occurs when all four of the following conditions are met: (1) mutual exclusion in which a resource is assigned to one process; (2) hold and wait in which resources are acquired incrementally and processes may hold one resource while waiting for another; (3) no preemption, in which allocated resources cannot be forcibly acquired by another process; and (4) circular wait in which two or more processes form a circular chain of dependency with each process waiting for a resource held by another.

In the context of network messaging, "resources" are defined as the buffer spaces available to hold network messages while in transit from one node to another node and "processes" are defined as the nodes which generate and consume the network messages. When deadlock occurs, some nodes in the network are unable to make progress (i.e., service the network messages). Without appropriate recovery measures, the network must initiate a reset or interrupt, which may result in a loss of messages and cause damage to the system as a whole.

Deadlock may be dealt with by any of several techniques including prevention, avoidance, and detection and recovery. Prevention techniques remove one of the four conditions described above, thereby making it impossible for a deadlock to occur. Avoidance techniques check for the deadlock conditions before allocating each resource, and allow the allocation only if there is no possibility of deadlock. Detection and recovery techniques do not prevent or avoid deadlock, but detect deadlock situations after they occur and then recover from those deadlock situations.

One common technique for avoiding deadlock provides two separate interconnects, or two separate channels within the same interconnect, for request and reply messages. In this technique, a node guarantees sufficient buffering for its reply messages by limiting the number of requests it has outstanding. An example of this is described in ANSI/IEEE Std. 1596–1992, Scalable Coherence Interface (SCI) (1992). In networks that only allow a simple request-reply messaging protocol, this technique is sufficient to avoid deadlock.

With more sophisticated messaging protocols, such as those that allow request forwarding, the two-interconnect technique may be extended by increasing the number of interconnects. However, the number of required independent interconnects corresponds to the maximum length of the dependence chains in the messaging protocols.

Another technique, described by Lenoski and Weber in Scalable Shared-Memory Multiprocessing (1995), allows request forwarding messaging with two separate interconnect channels, but couples the two channels with a back-off mechanism in the messaging protocol. When a potential deadlock situation is detected the back-off mechanism reverts to a request-reply transaction by sending a negative acknowledgement reply to all requests which need forwarding until the potential deadlock situation is resolved.

However, requiring separate interconnects or interconnect channels for request and reply messages imposes additional overhead on the interconnection network and its management structures. The multiple-interconnect techniques also impose complexity on the messaging protocol because messages on the separate interconnects can not be ordered with respect to one another and simplifying assumptions about message ordering cannot be made. Having back-off mechanisms also adds complexity to the messaging protocol.

Another technique, which employs detection and recovery, involves extending the buffer space available when deadlock is detected. This has been implemented in the Alewife machine by Kubiatowicz and Agarwal, "Anatomy of a Message in the Alewife Multiprocessor," Proceedings of the 7th International Conference on Supercomputing (1993). In the Alewife approach, a network interface chip signals an interrupt to the processor when its output queue has been blocked for some specified period of time. The processor then empties the input queue into local memory.

The Alewife approach emulates a virtually infinite buffer by augmenting the input queue in local memory whenever it overflows. But it does not address management of this buffer size. Moreover, Alewife relies on first detecting a potential deadlock situation and then resolving the deadlock situation in software by having the processor extend the queue into local memory. This is not always feasible because the processor may have outstanding requests that are caught in the same deadlock and, without special abort and fault recovery mechanisms, cannot service an interrupt until this deadlock has been resolved.

What is required, therefore, is a technique to avoid messaging deadlock that does not increase the interconnect-management overhead required to support separate interconnect channels for request and reply messages and that eliminates the complexities of back-off mechanism support and software-managed deadlock recovery.

SUMMARY OF THE INVENTION

The present invention provides a computer architecture for avoiding a deadlock while controlling messages between nodes in a multi-node computer network.

The invention, avoiding deadlock, inserts a buffer and associated control circuitry between the output of a node and the network in order to buffer all outgoing network messages from that node. Proper sizing of the buffer along with associated flow control circuitry guarantees sufficient buffering such that the buffer does not overflow and at least one in a group of nodes involved in a circular wait is always able to service incoming messages, thereby facilitating forward progress and avoiding deadlock.

To effectively manage the buffer, network messages are classified into preferably three types based on their service requirements and messaging protocols. In the preferred embodiment, these message types are called reliable transaction messages, posted messages, and unreliable transaction messages. The invention reserves a quota for each of the message types in the buffer and, based on this quota, controls the number of network messages of each type that is outstanding at any one time. The total buffer size is the sum of the space requirements of these message types. In one embodiment the invention further differentiates within each type of message to allow a more precise space requirement. Other considerations to reduce the buffer size are also incorporated.

The architecture of the invention thus includes a buffer for receiving outgoing messages to the interconnect, a decoder for decoding the messages into different message types, and an output controller coupled to the buffer and to the decoder for controlling the passage of the messages through the buffer.

The invention avoids the interconnect-management overhead required to support separate request and reply channels. The invention also eliminates the complexities in the messaging protocols that support message back-off and those associated with software-managed deadlock recovery procedures.

DETAILED DESCRIPTION OF THE PREFERRED EMBODIMENT

The present invention provides a computer architecture for avoiding deadlock while controlling messages between nodes in a multi-node computer network. The invention includes a messaging buffer having an optimum size precalculated to temporarily store outgoing messages from a node. The messages are classified according to their service requirements and messaging protocols, and reserved quotas in the messaging buffer are allocated for different types of messages. The reserved quotas are controlled by a mechanism that, to prevent overflow, limits the maximum number of messages that can be outstanding at any time. The messaging buffer is large enough to guarantee that a node is always able to service incoming messages, thereby avoiding deadlock and facilitating forward progress. The buffer may be bypassed to improve system performance when the buffer is empty or when data in the buffer is corrupted. In addition, a multicast engine receives information from a message header to determine whether there is a multicast to perform and to permit passage of messages.

Figure 1:
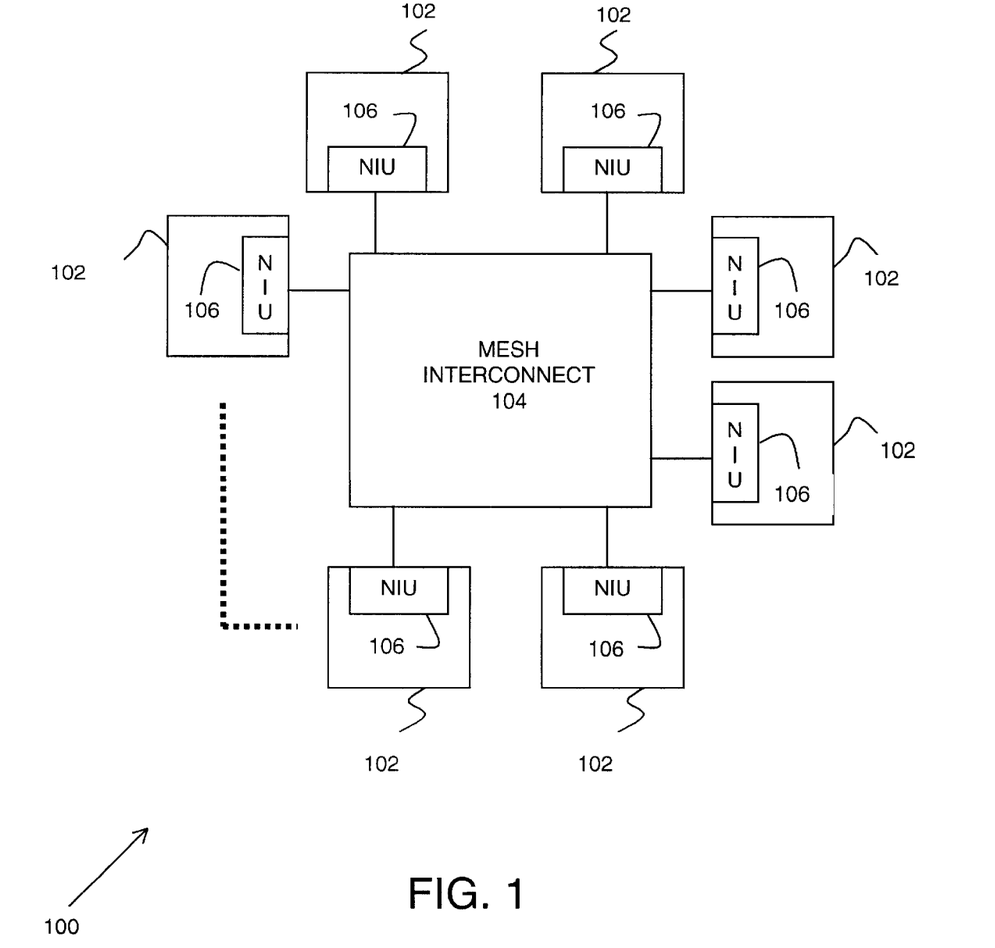
FIG. 1 is a block diagram showing a computer network having a plurality of nodes connected via a network interface unit to an interconnect.

FIG. 1 shows a computer network 100 having a plurality of nodes 102 and an interconnect 104. Each node 102 is configured either as a stand-alone data processing system, or as part of a data processing system made up of a collection of nodes 102. In the latter case, common resources such as memory and/or input/output (I/O) are shared among the member nodes. In addition, each node 102 includes a network interface unit (NIU) 106, which connects the respective node 102 to interconnect 104. Preferably, interconnect 104 provides point-to-point communication between the connected nodes 102.

Figure 2:
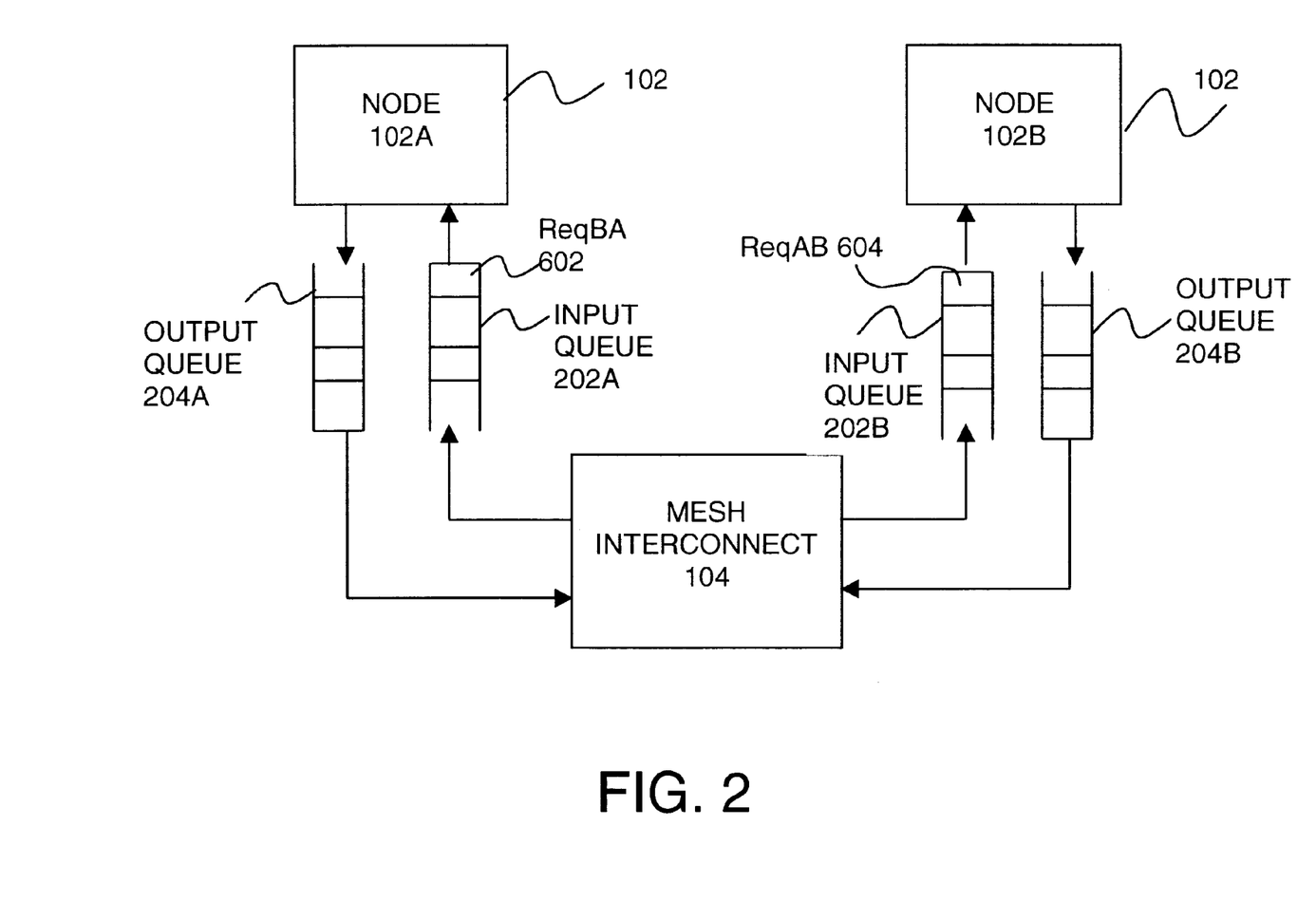
FIG. 2 is a block diagram illustrating a deadlock condition within a two-node network.

FIG. 2 is a block diagram illustrating a deadlock condition in a network of two nodes 102A and 102B, each of which includes a respective input queue 202A or 202B and a respective output queue 204A or 204B. Input queues 202A and 202B store incoming network messages and output queues 204A and 204B store outgoing network messages. A network message travels from an output queue 204A or 204B through interconnect 104 to an input queue 202A or 202B. The queues model the buffer spaces available to hold the message ReqBA 602 and message ReqAB 604 while they are in transition between nodes 102A and 102B. As destination node 102A or 102B becomes blocked and is not able to service incoming messages, further incoming messages first begin to fill the node's respective input queue 202A or 202B, and eventually back up through interconnect 104 into the sending node's respective output queue 204B or 204A.

In the FIG. 2 illustration, input and output queues 202A, 202B, 204A, and 204B are full. These queues cannot free up space until message ReqBA 602 and message ReqAB 604 are serviced and removed from the heads of the respective input queues 202A and 202B. Node 102A cannot service request message ReqBA 602 without generating a corresponding response message into output queue 204A. However, output queue 204A is full and cannot free up space until after input queue 202B of node 102B frees up space. Therefore, message ReqBA 602 is blocked until output queue 204A is no longer full. Similarly, node 102B is blocked from servicing request message ReqAB 604 because output queue 204B is full and it cannot process the request message ReqAB 604 until after input queue 202A of node 102A frees up space. As long as the deadlock condition exists neither node 102 can service the respective requests.

In the FIG. 2 illustration each of the four conditions for deadlock is met. First, there is mutual exclusion because each entry in input and output queues 202A, 202B, 204A, and 204B is occupied by at most one network message generated from node 102A or 102B. Second, there is hold and wait because each node 102A and 102B blocks its respective input queue 202A or 202B from receiving new network requests while each node 102 waits for space to become available in its respective output queue 204A or 204B. Third, there is no preemption because network messages can only be removed voluntarily at their destination node (that is, only node 102A can remove a message from input queue 202A, and only node 102B can remove a message from input queue 202B). And fourth, both nodes 102A and 102B are in circular wait because each node 102 is waiting for the other node 102 to free up space in its respective input queue 202A or 202B.

FIG. 2 illustrates distinct queues 202A, 202B, 204A, and 204B serving as messaging buffers for the network messages. This imposes an extra ordering constraint and makes deadlock easier to occur. However, deadlock can occur even if the buffers are not implemented as queues. Additionally, these messaging buffers are shown between nodes 102 and interconnect 104. In the preferred embodiment, the messaging buffers are in an NIU 106, which is part of a node 102. In alternate embodiments, the messaging buffers may be contained in other parts of nodes 102 and/or interconnect 104.

Figure 3:
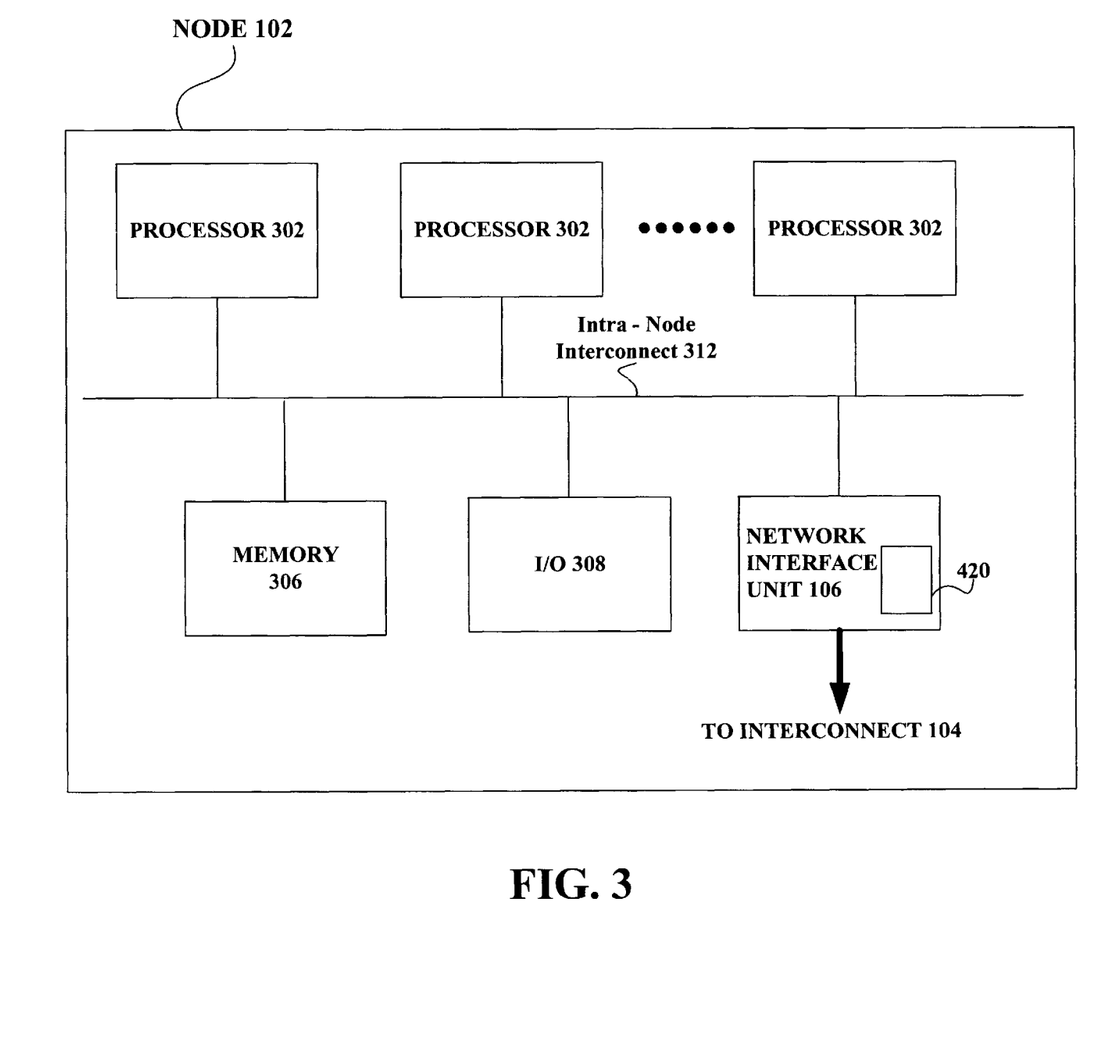
FIG. 3 is a block diagram of a node of FIG. 1.

FIG. 3 is a block diagram of FIG. 1 node 102 in an embodiment which includes multiple processors 302, memory 306, I/O 308, and NIU 106 connected by an intra-node interconnect 312, preferably a system bus. Alternatively, intra-node interconnect 312 may be a crossbar backplane. Further, even though FIG. 3 shows elements 302, 306, and 308 in a node 102, the invention is applicable in different combinations of various elements 302, 306, 308, and 106 being integrated in a semiconductor chip. Preferably, NIU 106 generates and receives network messages in response to requests and replies from processors 302 and other elements 306 and 308 in the node 102. NIU 106 includes a messaging buffer 420 and is connected to interconnect 104. Network messages pass from one node 102 through NIU 106 and interconnect 104 to another node 102. The network messages are temporarily stored in messaging buffer 420.

Figure 4:
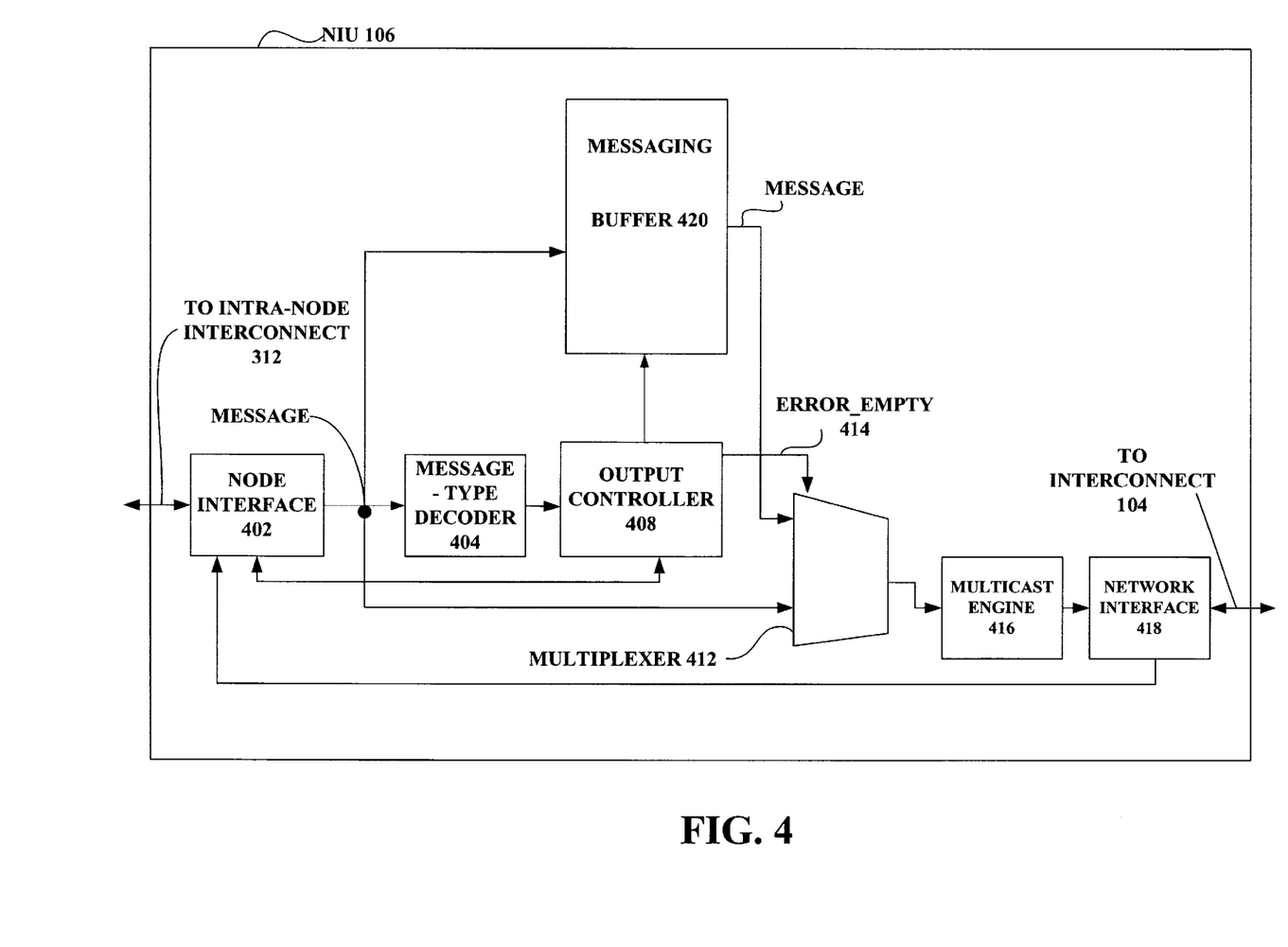
FIG. 4 is a block diagram of a Network Interface Unit (NIU) of FIG. 3.

FIG. 4 is a block diagram of one embodiment of FIG. 3 NIU 106, which includes messaging buffer 420 and its associated control circuitry including node interface 402, message-type decoder 404, output controller 408, multiplexer 412, multicast engine 416, and network interface 418.

Node interface 402, which is a communication point between intra-node connect 312 and NIU 106, generates outgoing network messages and receives and processes incoming network messages from interconnect 104.

Decoder 404 receives outgoing network messages from node interface 402 and decodes them to different message types according to their service requirements and messaging protocols. In the preferred embodiment, there are three types of messages: (1) reliable transaction messages, (2) posted messages, and (3) unreliable transaction messages. A transaction refers to a series of network messages initiated by a node 102 when it seeks to communicate or exchange resources with other nodes 102 in the network. Reliable transaction messages are messages associated with transactions which need to complete reliably by hardware, that is, the messages are always guaranteed to be delivered, received, and serviced by the destination node 102. Posted messages are individual messages that arrive at the destination node without requiring a reply message or other response message. Unreliable transaction messages are messages associated with transactions which do not need to complete reliably by hardware, but are managed by a layer of software which can recover from uncompleted transactions. The software checks for time-out of the transactions and can initiate the transaction again if it does not complete within the allocated time-out. As a result, unreliable transaction messages can be dropped by the network hardware, i.e., they can be removed from interconnect 104 without being serviced. For simplicity, individual messages which do not need to complete reliably are categorized as posted messages. Taken together, these three message types characterize a broad range of communication traffic.

A system designer selects which message types to use based on system requirements. For example, reliable transaction messages and/or posted messages are suitable for hardware-based schemes for maintaining cache-coherency and memory consistency in a shared-memory multiprocessor system. In contrast, unreliable transaction messages are suitable for systems using message-passing primitives, which have software-based reliance checking.

Output controller 408 manages the message buffering through messaging buffer 420 and keeps track of the messages within buffer 420. Output controller 408, together with node interface 402, also maintains reserved quotas in buffer 420 for different types of messages and ensures that the reserved quotas in buffer 420 are not exceeded by each of the message types. Programmable control registers (not shown) inform output controller 408 and node interface 402 of the reserved quota available for each message type.

For posted messages, when a node 102 reaches its quota, output controller 408 signals node interface 402 that the quota has been reached. For reliable transaction messages, node interface 402 counts the number of outstanding reliable transactions that it has initiated. When the prescribed quota of posted messages or reliable transactions is reached, node interface 402 stalls or retries new requests which might otherwise cause node interface 402 to initiate more messages of the particular type. When node 102 reaches its quota of unreliable transaction messages, output controller 408 signals node interface 402 to stop initiating unreliable transactions. Node interface 402 also drops any incoming unreliable transaction messages that require a response message. Consequently, a response message is not generated. A dropped message eventually becomes a transaction time-out at the initiating node 102.

Output controller 408 transfers network messages from buffer 420 to multiplexer 412. In addition, output controller 408 may transfer network messages directly from node interface 402 to multiplexer 412, thus bypassing buffer 420. During the buffer 420 bypass, output controller 408 sends multiplexer 412 an error-empty signal on line 414, and multiplexer 412 selects the network message from node interface 402. Output controller 408 bypasses buffer 420 when buffer 420 is empty (to improve performance) or when an uncorrectable error is detected on reading a message out of buffer 420. Because the messages occupy buffer 420 in a dense format, an uncorrectable error in a portion of buffer 420 corresponding to the message header corrupts the entire buffer 420. This is because the size of the corrupted message specified in the header and the beginning of subsequent messages can no longer be determined.

Multiplexer 412 transfers the network message to multicast engine 416, which determines if the message is to be transferred to more than one node 102. Multicast engine 416 uses destination information in the message header to generate and send a separate message to each destination node 102. In the preferred embodiment, multicast engine 416 is outside of buffer 420, and the multicasting scheme occupies only one entry in buffer 420 to minimize its size.

Network interface 418 transfers outgoing network messages from multicast engine 416 to interconnect 104 and incoming network messages from interconnect 104 to node interface 402.

Buffer 420, temporarily storing outgoing messages from a node 102, has a size precalculated to store reserved quotas for each message type. The allocations of the reserved quotas are controlled by a mechanism, that, to prevent buffer 420 from overflowing, limits the maximum number of messages that can be outstanding at any time. Consequently, buffer 420 is sized large enough to guarantee that a node is always able to service incoming messages, thereby avoiding deadlock and facilitating forward progress in communications.

The quota of buffer 420 reserved for reliable transaction messages is determined by the product of: (1) the maximum number of outstanding transactions per node, (2) the maximum message fan-out per transaction, (3) the size of each message, and (4) half the total number of nodes requiring reliable communication with one another. The total number of nodes is halved because at least two buffers are involved in a circular wait. The calculation of message fan-out for different types of message transactions will be discussed with reference to FIGS. 5A through 5D.

The quota of buffer 420 in each node 102 reserved for posted messages is defined by the number of posted messages that the node 102 may have outstanding. A posted message is outstanding from the time it is issued by node interface 402 of the initiating node until it leaves buffer 420 of the initiating node. It is not necessary to wait until the posted message arrives at its destination node 102 to decrement its outstanding count because the buffer space calculations are made for the outgoing buffer 420.

The quota allocated for unreliable transaction messages is determined by the expected frequency of such transactions and sized such that overflow of the quota is rare.

The total size of buffer 420, which represents the maximum number of messages that can occupy buffer 420 at any one time, is the sum of the space requirements for the different types of messages. Additionally, buffer 420 is partitioned to suit the system configuration based on the predominant pattern of communication traffic employed by the system. A system designer, to partition buffer 420, alters the programmable control elements in output controller 408 and in node interface 402. For example, in a parallel processing computer system, the shared memory traffic component requires reliable transactions and posted messages; however, the message-passing traffic component requires posted and unreliable transaction messages. Thus, in a message-passing only system, buffer 420 may be partitioned solely for posted and unreliable transaction messages. Consequently, buffer 420 may be customized for the communication traffic pattern in the system and remain fully utilized in all configurations.

The total size of messaging buffer 420 is an important consideration when implementing the method for avoiding deadlock according to the invention. The invention therefore incorporates several mechanisms to reduce that size. Firstly, the invention permits further differentiation within each message type to allow calculating a more precise space for buffer 420. For example, because in the preferred embodiment an intervention transaction has a smaller maximum message fan-out than a regular transaction, the invention, within the reliable transaction message type, differentiates between intervention transactions and regular transactions. Consequently, a more precise fan-out can be used for each type of transaction, which results in a smaller buffer size requirement for reliable transaction messages. Secondly, the invention preferably relies on a layer beneath the network messaging layer to guarantee delivery of a message between nodes 102. In the preferred embodiment, this is implemented in network interface 418. Guaranteeing delivery removes the requirement for acknowledgements at the network messaging layer and thereby greatly reduces fan-out. Thirdly, the multicast engine mechanism enables a multicast message to occupy only one entry in buffer 420, further minimizing the size of buffer 420. Fourthly, the invention stores messages preferably in buffer 420 in a dense format. Therefore, messages which carry no data occupy less space in the buffer 420 than messages carrying data. The size of each message is specified in its header.

In the preferred embodiment, buffer 420 is a Static Random Access Memory (SRAM) included in NIU 106 in one semiconductor chip. For example, a medium-scale multiprocessor interconnection network may have a total of thirty-two nodes, with multiple groups of up to four nodes sharing the same memory and thus requiring reliable communication. Each node 102 comprises a standard Intel® Quad Pentium-Pro® AP450GX server platform containing four Pentium Pro Processors 302, up to one GByte of Dynamic Random Access Memory (DRAM) for memory subsystem 306, and two PCI bridges for attaching I/O 308. NIU 106 generates network messages of between sixteen and forty-eight bytes which support both shared-memory and message-passing type communication traffic. In this example embodiment, buffer 420 is implemented as an 8 kilobyte First-In-First-Out (FIFO) SRAM.

In an alternative embodiment, buffer 420 may be extended into a reserved portion of DRAM 306 in the local node 102 (FIG. 3) that comprises NIU 106. This alternative embodiment detects when the portion of buffer 420 on the integrated circuit chip has overflowed and performs management swapping via Direct Memory Access (DMA) into and out of the DRAM 306. NIU 106 performs the DMA without requiring software intervention or new network messages to be generated into interconnect 104. Since DRAM is relatively inexpensive, a large space of buffer 420 can be allocated in DRAM at a reduced cost. For better performance, the on-chip portion of buffer 420 is sized appropriately so that overflow is rare.

FIGS. 5A–5D illustrate the calculation of message fan-out for different types of messaging transactions. Fan-out is the number of messages associated with a transaction that can be in transition simultaneously within interconnect 104. A first node 102 (initiating node 102) initiates a transaction by sending a request message to a second node 102. In response, the second node 102 generates a reply to the initiating node 102. The second node 102 may also or alternatively generate a message chain to a third node or to a series of nodes 102. Once the transaction is complete, the initiating node 102 receives a completion message. A transaction is outstanding from the time the initiating node 102 issues the request message until the time the initiating node 102 receives the completion message. At any moment, a node 102 may have a number of outstanding transactions in progress.

New requests, called interventions, are sometimes generated in the course of a transaction. For example, eviction messages may be required to free resources necessary to service a transaction. Interventions are considered the start of new transactions in the buffer space calculation.

Figure 5A:
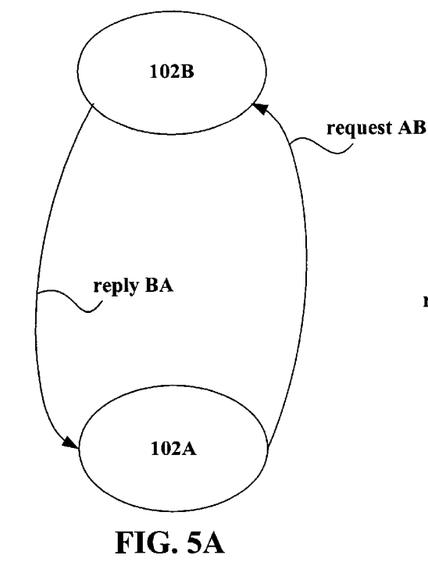
FIGS. 5A through 5D illustrate the calculation of message fan-out for different types of messaging transactions.

FIG. 5A shows a basic request-reply transaction. Node 102A sends a request message AB to node 102B, which responds with a reply message BA to node 102A. Request message AB must be received at node 102B before node 102B generates the reply message BA. Therefore, at any time, there is only one message, either AB or BA, in transit in interconnect 104. Consequently, the fan-out for a request-reply transaction is one.

Figure 5B:
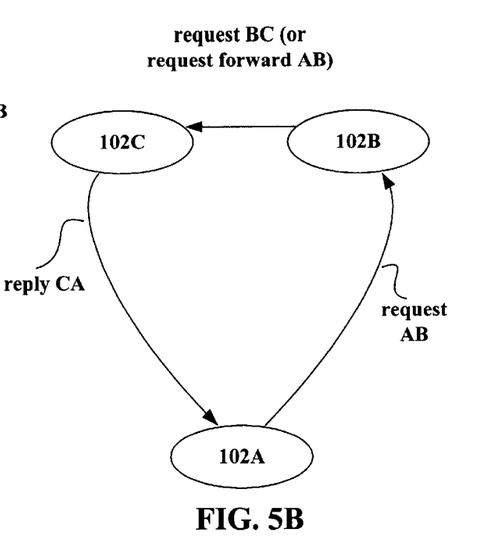

FIG. 5B shows a request forwarding transaction. Node 102A sends a request message AB to node 102B. Node 102B then forwards request message AB (now message BC) to node 102C. Node 102C then responds with reply message CA to node 102A. Each message AB, BC, and CA must be received by its destination node 102 before that node 102 generates the next message. That is, there is at most one message in interconnect 104 at any time, and thus the fan-out for this transaction is one.

Figure 5C:
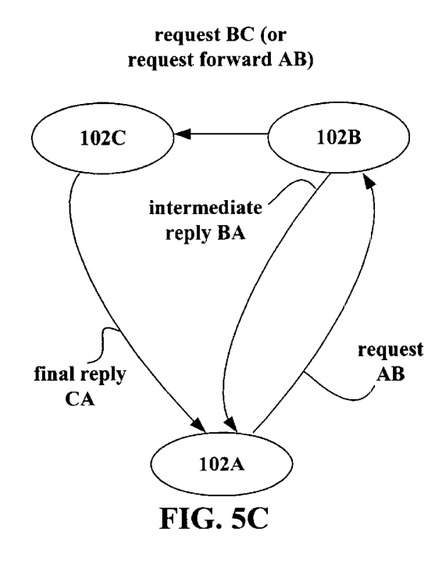

FIG. 5C shows a request forwarding transaction with intermediate reply. Node 102A sends a request message AB to node 102B. Node 102B then forwards the message request AB (now message BC) to node 102C and simultaneously sends an intermediate reply message BA to node 102A. Node 102C also responds to message BC with a final reply message CA to node 102A. Because intermediate reply BA may be in transition within interconnect 104 at the same time as either request message BC or final reply message CA, the fan-out for this transaction is two.

Figure 5D:
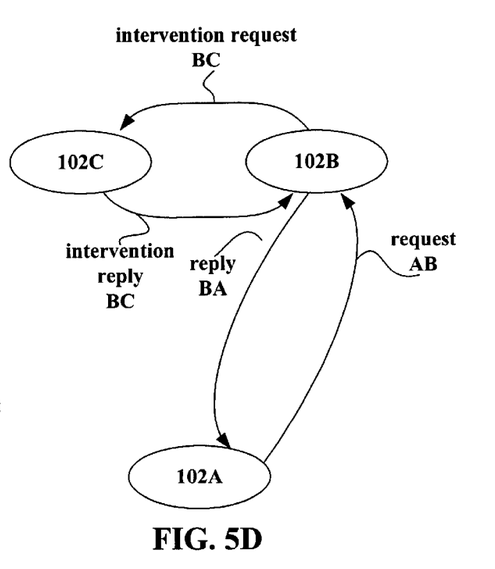

FIG. 5D shows an intervention transaction generated in response to a request-reply transaction. While servicing a request message AB from node 102A, node 102B also generates an intervention request message BC to node 102C. Node 102C returns an intervention reply message CB to node 102B. Since both transactions, from node 102A to node 102B and from node 102B to node 102C, are a simple request-reply chain, the fan-out for each transaction is one.

Figure 6:
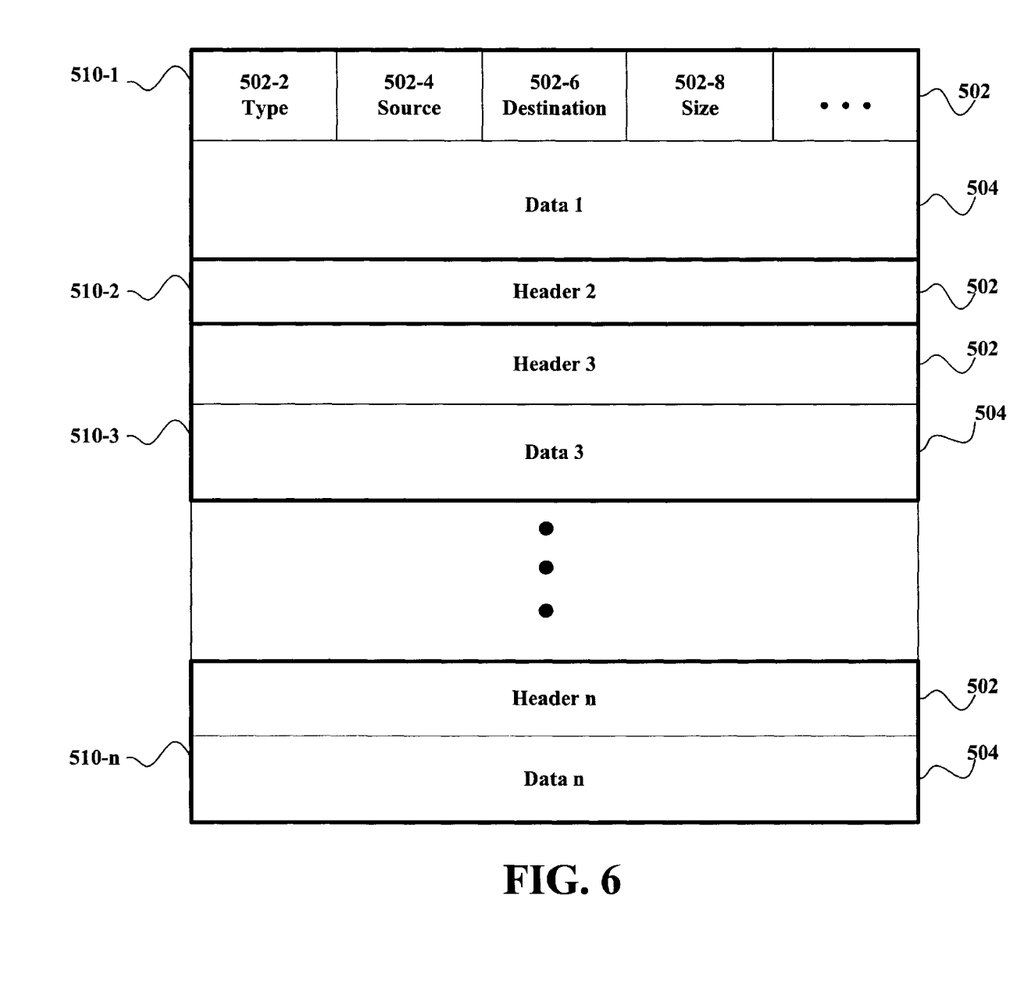
FIG. 6 shows an embodiment of the messaging buffer of FIG. 4.

FIG. 6 is an embodiment of messaging buffer 420. In this FIG. 6 embodiment, buffer 420 stores a plurality of network messages 510-1 through 510-n as they flow through buffer 420. Each network message 510 includes a header 502 and variable data 504. In the preferred embodiment, header 502 includes the message type 502-2, message source 502-4, message destination 502-6, and message size 502-8. Message type field 502-2 indicates whether the message 510 type is a reliable transaction message, posted message, or unreliable transaction message. Message source field 502-4 indicates the source node 102 of message 510. Message destination field 502-6 indicates the nodes 102 where message 510 is to be sent. Message size field 502-8 indicates the size of message 510. In alternate embodiments, header 502 may contain other fields with other information about message 510.

The present invention has been explained above with reference to a preferred embodiment. Other embodiments will be apparent to those skilled in the art in light of this disclosure. For example, the invention may be implemented in other configurations. Additionally, the invention may be used effectively in conjunction with networking systems other than those described. Therefore, these and other variations upon the preferred embodiment are intended to be covered by the appended claims.

What is claimed is:

1. A message passing apparatus for avoiding deadlock in a multi-node computer network, comprising:

a buffer for receiving network messages of various types including reliable transaction messages associated with transactions that must be completed reliably, and unreliable transaction messages associated with transactions that do not need to be completed reliably, said message types being classified based on their service requirements and messaging protocols;

a decoder for decoding the types of said network messages; and an output controller coupled to said buffer and to said decoder for controlling the passage of said messages trough said buffer.

2. The apparatus of claim 1 wherein said buffer is coupled between an output of a node and a network.

3. The apparatus of claim 1 wherein said buffer is variably partitioned to suit a system configuration based on a predominant pattern of traffic of said network messages.

4. The apparatus of claim 1 wherein said network messages are stored in said buffer in a dense format.

5. The apparatus of claim 1 further comprising a multicast engine, coupled to said buffer, for determining whether there is a multicast to permit passage of messages and for reducing the number of entries needed in said buffer for a multicast message.

6. The apparatus of claim 1 further comprising a bypass engine coupled to said buffer for permitting messages to bypass said buffer, depending on a state of said buffer.

7. The apparatus of claim 1 wherein said buffer is extendable upon an indication of an overflow of messages stored in said buffer.

8. The apparatus of claim 1 wherein said buffer includes, for each of said network message types, a reserved quota based on a maximum number of outstanding messages allowed for the respective message type.

9. The apparatus of claim 8 wherein said reserved quota prevents overflow of said buffer.

10. The apparatus of claim 8 wherein the size of said buffer is large enough so that a node is always able to service incoming messages, thereby avoiding deadlock and facilitating forward progress in communications.

11. The apparatus of claim 8 wherein the size of said reserved quota for said posted messages is based on a number of said posted messages that a node is permitted to have outstanding.

12. The apparatus of claim 8 wherein the size of said reserved quota for said unreliable transaction messages is based on an expected frequency of a transaction associated with said unreliable transaction messages.

13. The apparatus of claim 1 wherein each of said message types includes a plurality of sub message types.

14. The apparatus of claim 13 wherein said sub message types for said reliable transaction messages include intervention-transaction and regular-transaction message types.

15. The apparatus of claim 13 wherein said sub message types allow space conservation for said buffer.

16. The apparatus of claim 1 wherein said network messages include a header having information on whether there is a multicast.

17. The apparatus of claim 1 wherein said output controller limits a number of network messages of each of said network message types.

18. The apparatus of claim 1 further comprising a network interface for guaranteeing message delivery in said network to reduce a number of message fan-out.

19. A message passing apparatus for avoiding deadlock in a multi-node computer network, comprising:

a buffer for receiving network messages of various types classified based on their service requirements and messaging protocols and including reliable transaction messages associated with transactions that must be completed reliably, posted messages associated with transactions that do not require a reply or other response message, and unreliable transaction messages associated with transactions that do not need to be completed reliably, said buffer having a reserved quota for each of said network message types based on a maximum number of outstanding messages allowed for the respective message type, the size of said reserved quota for said reliable transaction messages being a product of a maximum number of outstanding transactions per node, a maximum number of message fan-outs per transaction, a size of each message type, and half of a total number of nodes requiring reliable communication with one another;

a decoder for decoding said network message types; and an output controller coupled to said buffer and to said decoder for controlling the passage of said messages through said buffer.

20. A method for avoiding deadlock in a multiple-node computer network using network messages, comprising the steps of:

providing a buffer for storing said network messages;

classifying said network messages into different types including         reliable transaction messages associated with transactions that must be completed reliably,         posted messages associated with transactions that do not require a reply or other response message, and         unreliable transaction messages associated with transactions that do not need to be completed reliably;

allocating reserved areas for said types of messages in said buffer, and     implementing a flow control mechanism to ensure said reserved allocations are not exceeded.

21. A data processing system for avoiding deadlock in a multi-node computer network, comprising:

an inter-processor communication network;

a first processor node including at least one processor;

a first network interface unit coupled to said first processor node and coupled to said network, said first network interface unit including:

a first buffer for receiving first network messages from said first processor node;

a first decoder for decoding said first network messages into different types; and         a first output controller coupled to said first buffer and to said first decoder for controlling the passage of said first messages through said first buffer;

a second processor node including at least one processor;

a second network interface unit coupled to said second processor node and coupled to said network, said second network interface unit including:

a second buffer for receiving second network messages from said second processor node;

a second decoder for decoding said second network messages into different types; and     a second output controller coupled to said second buffer and to said second decoder for controlling the passage of said second messages.

\* \* \* \* \*